(12) United States Patent
Zhai

(10) Patent No.: US 11,551,236 B2
(45) Date of Patent: Jan. 10, 2023

(54) METHOD AND SYSTEM FOR USER PROTECTION IN RIDE-HAILING PLATFORMS BASED ON SEMI-SUPERVISED LEARNING

(71) Applicant: Beijing DiDi Infinity Technology and Development Co., Ltd., Beijing (CN)

(72) Inventor: Jinjian Zhai, Union City, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 284 days.

(21) Appl. No.: 16/911,183

(22) Filed: Jun. 24, 2020

(65) Prior Publication Data

US 2021/0406916 A1  Dec. 30, 2021

(51) Int. Cl.
| | |
|---|---|
| *G01C 21/34* | (2006.01) |
| *G01C 21/36* | (2006.01) |
| *G06Q 50/30* | (2012.01) |
| *G06N 20/00* | (2019.01) |
| *G06N 3/08* | (2006.01) |
| *G06Q 10/02* | (2012.01) |
| *G06Q 30/02* | (2012.01) |
| *G06Q 30/00* | (2012.01) |
| *G06F 21/44* | (2013.01) |

(52) U.S. Cl.
CPC ......... *G06Q 30/0185* (2013.01); *G06F 21/44* (2013.01); *G06N 20/00* (2019.01); *G06Q 50/30* (2013.01)

(58) Field of Classification Search
CPC ............ G01C 21/3438; G01C 21/3453; G01C 21/3617; G01C 21/3626; G01C 21/3679; G06N 20/00; G06N 3/08; G06Q 10/02; G06Q 30/0202; G06Q 30/0282; G06Q 30/0284; G06Q 50/30
See application file for complete search history.

(56) References Cited

U.S. PATENT DOCUMENTS

| | | | |
|---|---|---|---|
| 10,248,913 B1 * | 4/2019 | Gururajan | G06Q 50/30 |
| 11,346,676 B2 * | 5/2022 | Tang | G06Q 30/0202 |
| 2017/0293925 A1 * | 10/2017 | Marueli | G06Q 30/0206 |
| 2020/0175632 A1 * | 6/2020 | Vora | G06Q 10/063114 |
| 2020/0380027 A1 * | 12/2020 | Aggarwal | G06N 20/00 |
| 2020/0401629 A1 * | 12/2020 | Lin | G06F 16/9535 |

* cited by examiner

*Primary Examiner* — Daniel St Cyr
(74) *Attorney, Agent, or Firm* — Sheppard Mullin Richter & Hampton LLP

(57) ABSTRACT

Methods, systems, and apparatus for detecting malicious activities in a ride-hailing platforms are described. An exemplary method comprises: identifying a set of trips from historical data to form training data; training a classifier based on a plurality of features of the set of trips in the training data to identify whether a given trip is malicious or benign; deploying the classifier to classify new trips in the ride-hailing platform for a first period of time to obtain a plurality of malicious trip candidates; storing the plurality of malicious trip candidates in a staging database for a second period of time for data cleansing based on supplementary data collected during the second period of time; fetching, from the staging database, a set of malicious trip candidates that have been stored in the staging database longer than the second period of time; and re-training the classifier.

20 Claims, 6 Drawing Sheets

METHOD AND SYSTEM FOR USER PROTECTION IN RIDE-HAILING PLATFORMS BASED ON SEMI-SUPERVISED LEARNING

TECHNICAL FIELD

The disclosure generally relates to systems and methods for user protection in ride-hailing platforms, in particular, for detecting malicious user activities based on semi-supervised machine learning algorithms in a ride-hailing environment.

BACKGROUND

On-demand ride-hailing services have seen rapid expansion in recent years. One critical aspect of the ride-hailing services is to detect and monitor malicious activities. Various malware and system tools may be installed in user smartphones, for example, to fake GPS signals, gain rooting access to the system, change device ID, etc. These malicious activities may bypass safety checks and information security strategies and algorithms, and lead to physical and financial damages to not only the platforms offering the services but also the users of the services. Generally, the ride-hailing service providers employ offline learning methods to train machine learning models based on historical data to detect new malicious trips. In order to produce an accurate model, the training process requires sufficient training data to be collected from historical data. However, the number of malicious trips/activities in the historical data is usually small, and the samples are generally not comprehensive. Therefore, an automatic, accurate, and self-learning malicious activity detection and monitoring system is desirable in the daily operation of the ride-hailing services.

SUMMARY

Various embodiments of the present specification may include systems, methods, and non-transitory computer readable media for detecting malicious activities in a ride-hailing platform.

According to one aspect, the method for detecting malicious activities in a ride-hailing platform comprises: identifying a set of trips from historical data to form training data, wherein the set of trips comprise one or more malicious trips and one or more benign trips; training a classifier based on a plurality of features of the set of trips in the training data to identify whether a given trip is malicious or benign, wherein the plurality of features comprise identification numbers of devices associated with the set of trips, and latitude/longitude information of the set of trips in the training data; deploying the classifier to classify new trips in the ride-hailing platform for a first period of time to obtain a plurality of malicious trip candidates; storing the plurality of malicious trip candidates in a staging database for a second period of time for data cleansing based on supplementary data collected during the second period of time for the plurality of malicious trip candidates, wherein a malicious trip candidate is removed from the staging database when the corresponding supplementary data indicate that the malicious trip candidate is false-positively classified; fetching, from the staging database, a set of malicious trip candidates that have been stored in the staging database longer than the second period of time; and re-training the classifier based on the plurality of features of trips in the set of malicious trip candidates.

In some embodiments, the classifier classifies the new trips as malicious or benign with corresponding confidence scores, the storing the plurality of malicious trip candidates into a staging database for a second period of time for data cleansing comprises assigning a Time-To-Live (TTL) to each of the plurality of malicious trip candidates based on the confidence score of the each malicious trip candidate; and the fetching a set of malicious trip candidates that have been stored in the staging database longer than the second period of time from the staging database comprises fetching a malicious trip that has been stored in the staging database longer than the assigned TTL.

In some embodiments, the method further comprises deploying the classifier to classify new trips to obtain a plurality of benign trip candidates with corresponding confidence scores; and sampling, from the plurality of benign trip candidates, a set of benign trip candidates with highest classification confidence scores; and updating the training data by adding the set of benign trip candidates.

In some embodiments, the supplementary data is extracted from a complaint proving the malicious trip candidate is false-positively identified.

In some embodiments, the identifying a set of trips from historical data comprises: for a historical trip, obtaining latitude information and longitude information across a plurality of points in time; obtaining an instantaneous velocity of the historical trip based on a first order derivative of the latitude information and longitude information; obtaining an instantaneous acceleration of the historical trip based on a second order derivative of the latitude information and longitude information; and determining the historical trip as a malicious trip when the instantaneous velocity or the instantaneous acceleration is greater than a corresponding threshold.

In some embodiments, the plurality of features further comprise: a list of applications installed on each of the devices, and access permissions to system services granted to the list of applications.

In some embodiments, the first period time is a day, and the second period of time is two weeks.

In some embodiments, the identifier numbers of the devices comprise International Mobile Equipment Identity (IMEI) numbers, and the deploying the classifier to classify new trips comprises: extracting IMEI numbers of a plurality of devices associated of a new trip at real-time; determining whether one of the plurality of devices has a IMEI number that matches an item in a blacklist; and sending a warning message to each of the plurality of devices other than the one device.

In some embodiments, the plurality of features further comprise MD5-lists of the applications that indicate versions of the applications installed on the devices.

In some embodiments, the method further comprises obtaining an android application package (APK) of one of the applications installed on the devices; determining one or more Uniform Resource Locators (URLs), Internet Protocol (IP) addresses, or domain names that the APK designed to visit; and determining whether a trip associated with the device is malicious based on the one or more URLs, IP addresses, or domain names.

According to another aspect, a system for detecting malicious activities in a ride-hailing platform may comprise one or more processors and one or more non-transitory computer-readable memories coupled to the one or more processors, the one or more non-transitory computer-readable memories storing instructions that, when executed by the one or more processors, cause the system to perform operations comprising: identifying a set of trips from historical data to form training data, wherein the set of trips comprise one or more malicious trips and one or more benign trips; training a classifier based on a plurality of features of the set of trips in the training data to identify whether a given trip is malicious or benign, wherein the plurality of features comprise identification numbers of devices associated with the set of trips, and latitude/longitude information of the set of trips in the training data; deploying the classifier to classify new trips in the ride-hailing platform for a first period of time to obtain a plurality of malicious trip candidates; storing the plurality of malicious trip candidates in a staging database for a second period of time for data cleansing based on supplementary data collected during the second period of time for the plurality of malicious trip candidates, wherein a malicious trip candidate is removed from the staging database when the corresponding supplementary data indicate that the malicious trip candidate is false-positively classified; fetching, from the staging database, a set of malicious trip candidates that have been stored in the staging database longer than the second period of time; and re-training the classifier based on the plurality of features of trips in the set of malicious trip candidates.

According to yet another aspect, a non-transitory computer-readable storage medium for detecting malicious activities in a ride-hailing platform may store instructions that, when executed by one or more processors, cause the one or more processors to perform operations comprising: identifying a set of trips from historical data to form training data, wherein the set of trips comprise one or more malicious trips and one or more benign trips; training a classifier based on a plurality of features of the set of trips in the training data to identify whether a given trip is malicious or benign, wherein the plurality of features comprise identification numbers of devices associated with the set of trips, and latitude/longitude information of the set of trips in the training data; deploying the classifier to classify new trips in the ride-hailing platform for a first period of time to obtain a plurality of malicious trip candidates; storing the plurality of malicious trip candidates in a staging database for a second period of time for data cleansing based on supplementary data collected during the second period of time for the plurality of malicious trip candidates, wherein a malicious trip candidate is removed from the staging database when the corresponding supplementary data indicate that the malicious trip candidate is false-positively classified; fetching, from the staging database, a set of malicious trip candidates that have been stored in the staging database longer than the second period of time; and re-training the classifier based on the plurality of features of trips in the set of malicious trip candidates.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The methods, systems, and storage mediums disclosed herein may involve a semi-supervised machine learning algorithm to train and test a large number of trips and user information for a ride-hailing platform. Here, the "semi-supervised" approach may involve a supervised learning phase where a malicious activity detection model is trained based on training data that are labelled (automatically or manually), and an unsupervised learning phase where the model is re-trained after the training data is automatically expanded based on newly detected data samples. This way, the model may be continuously optimized while the model is being used in the ride-hailing platform.

In this specification, the term "order" may refer to a ride-hailing order that involves two or more parties (at least one passenger, and one driver), and may be used interchangeably with the term "trip" unless explicitly specified otherwise.

Figure 1:
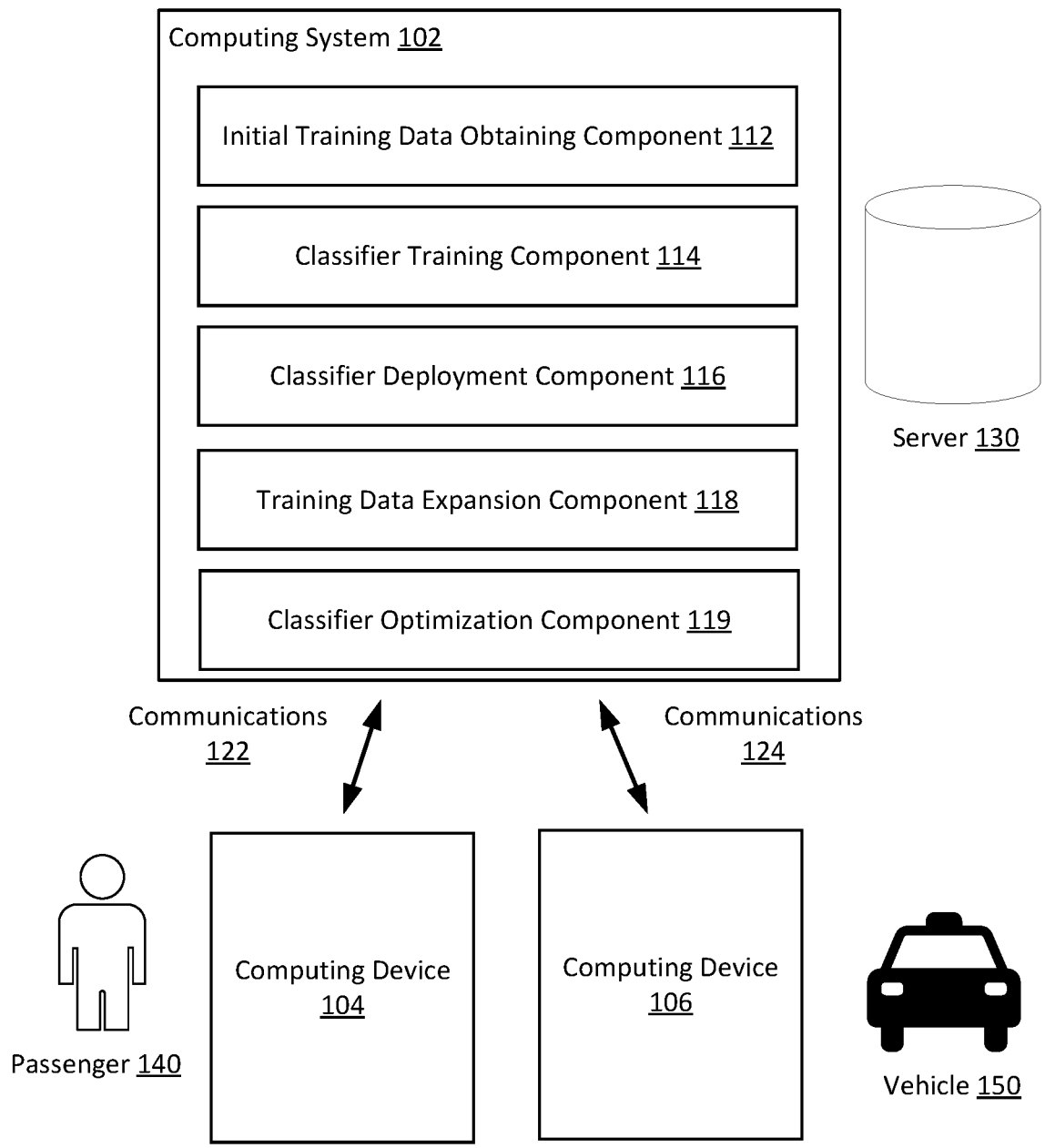
FIG. 1 illustrates an exemplary system to which detecting malicious activities in a ride-hailing platform may be applied, in accordance with various embodiments.

FIG. 1 illustrates an exemplary system 100 to which detecting malicious activities in a ride-hailing platform may be applied, in accordance with various embodiments. The exemplary system 100 may include a computing system 102, a computing device 104, and a computing device 106. It is to be understood that although two computing devices are shown in FIG. 1, any number of computing devices may be included in the system 100. Computing system 102 may be implemented in one or more networks (e.g., enterprise networks), one or more endpoints, one or more servers, or one or more clouds. A server may include hardware or software which manages access to a centralized resource or service in a network. A cloud may include a cluster of servers and other devices that are distributed across a network.

The computing devices 104 and 106 may be implemented on or as various devices such as a mobile phone, tablet, server, desktop computer, laptop computer, vehicle (e.g., car, truck, boat, train, autonomous vehicle, electric scooter, electric bike), etc. The computing system 102 may communicate with the computing devices 104 and 106, and other computing devices. Computing devices 104 and 106 may communicate with each other through computing system 102, and may communicate with each other directly. Communication between devices may occur over the internet, through a local network (e.g., LAN), or through direct communication (e.g., BLUETOOTH™, radio frequency, infrared).

In some embodiments, the system 100 may include a ride-hailing platform. The ride-hailing platform may facilitate transportation service by connecting drivers of vehicles with passengers. The platform may accept requests for transportation from passengers, identify idle vehicles to fulfill the requests, arrange for pick-ups, and process transactions. For example, passenger 140 may use the computing device 104 to order a trip. The trip order may be included in communications 122. The computing device 104 may be installed with a software application, a web application, an API, or another suitable interface associated with the ride-hailing platform.

While the computing system 102 is shown in FIG. 1 as a single entity, this is merely for ease of reference and is not meant to be limiting. One or more components or one or more functionalities of the computing system 102 described herein may be implemented in a single computing device or multiple computing devices. The computing system 102 may include an initial training data obtaining component 112, a classifier training component 114, a classifier deployment component 116, a training data expansion component 118, and a classifier optimization component 119.

In some embodiments, the initial training data obtaining component 112 may be configured to identify a set of trips from historical data to form training data, wherein the set of trips comprise one or more malicious trips and one or more benign trips. For example, exemplary malicious activities may include off-app trading, fake GPS signals to claim coupons or incentives, fake passenger or driver accounts, etc. In some embodiments, the initial sets of malicious and benign activities may be manually identified from the historical data to provide a "jump-start" to the automatic training process. In some embodiments, based on the malicious activities and the corresponding orders, the set of distinguishing features may be identified to classify a new trip, such as smart device information (e.g., models, versions, device ID of the devices used to book the trip), proxy information (e.g., whether a proxy network is used), URL links (e.g., the URL links led to the trip), application lists (e.g., lists of applications installed on the smart device(s) associated with the trip), permissions (e.g., permissions requested by or granted to the list of applications on the smart device), IP address (e.g., IP address of the smart device), location information (e.g., a series of latitude/longitude/altitude information during the trip), another suitable feature, or any combination thereof. In some embodiments, a trip may be determined as suspicious by: obtaining latitude information and longitude information across a plurality of points in time of the trip; obtaining an instantaneous velocity of the historical trip based on a first order derivative of the latitude information and longitude information; obtaining an instantaneous acceleration of the historical trip based on a second order derivative of the latitude information and longitude information; and determining the historical trip as a malicious trip when the instantaneous velocity or the instantaneous acceleration is greater than a corresponding threshold.

In some embodiments, the classifier training component 114 may be configured to train a classifier based on a plurality of features of the set of trips in the training data to identify whether a given trip is malicious or benign, wherein the plurality of features comprise identification numbers of devices associated with the set of trips, and latitude/longitude information of the set of trips in the training data. In some embodiments, the plurality of features may further comprise: a list of applications installed on each of the devices, access permissions to system services granted to the list of applications, International Mobile Equipment Identity (IMEI) numbers, other suitable features, or any combination thereof. The training process may be implemented using various algorithms, such as decision tree, naïve Bayes, artificial neural network (ANN), k-nearest neighbor (KNN), or another suitable algorithm. In some embodiments, the trained classifier may receive various information of an order (e.g., a trip), and output a label (e.g., a malicious order or a benign order) for the order. In some embodiments, the classifier may also output a confidence score along with the label. In some embodiments, the classifier may classify the order into a plurality of classes, such as a "fake GPS" order, a "fake account" order, an order from a malicious application.

In some embodiments, the classifier deployment component 116 may be configured to deploy the classifier trained by the classifier training component 114 in a ride-hailing platform classify new trips in the ride-hailing platform for a first period of time to obtain a plurality of malicious trip candidates. In some embodiments, the ride-hailing platform may include an online determination system to detect malicious activities. The trained classifier may be deployed as part of the online determination system to monitor and/or classify pending orders, orders being served, and orders that have been served. In some embodiments, the trained classifier may be deployed to classify the orders/trips that have already been served to detect malicious trips. In some embodiments, in addition to detecting malicious trips, the classification result may also include a plurality of benign trips In some embodiments, the training data expansion component 118 may be configured to store the plurality of malicious trip candidates in a staging database for a second period of time for data cleansing based on supplementary data collected during the second period of time for the plurality of malicious trip candidates, wherein a malicious trip candidate is removed from the staging database when the corresponding supplementary data indicate that the malicious trip candidate is false-positively classified; and fetch, from the staging database, a set of malicious trip candidates that have been stored in the staging database longer than the second period of time. The fetched set of malicious trip candidates may be used to expand the training data. For example, the trained classifier may be deployed to perform classification for a first period of time (e.g., a day) to collect a new set of benign trips and a new set of malicious trips.

In some embodiments, the new trips classified as malicious may be stored in a staging database for a second period of time, such as a predetermined soaking time, or a period of time for data cleansing. During this soaking time, supplementary data may be obtained regarding one or more of the trips in the staging database. The supplementary data may indicate that a trip in the staging database is false-positively classified as malicious. In these cases, the trip may be removed from the staging database. In some embodiments, the supplementary data may refer to received complaints (e.g., the complaints received by customer service) regarding the trips classified as malicious. For example, it may be natural for a user (e.g., a driver or a passenger) to file a complaint when his/her trip is falsely labeled as malicious or fake within a short period of time. Therefore, keeping the newly classified malicious trips in a staging database for a period of time may effectively filter out the false positives. For example, the newly classified malicious trips may stay in the staging database for as long as two weeks for data cleansing (e.g., removing false positives). In some embodiments, the staging database may be designed as a first-in-first-out queue or a sliding window queue. For example, assuming the newly classified malicious trips are added on a daily basis to the staging database and will stay therein for fourteen days for data cleansing, the malicious trips added on day 21 may be deemed "ripe" or "graduated" from the staging database, and may be fetched as new training data (new malicious trips for training) to re-train the classifier. In some embodiments, rather than uniformly forcing the set of newly classified malicious trips to be stored in the staging database for a same period of time (e.g., two weeks) for data cleansing, different malicious trips may be assigned with different time-to-live (TTL) values. For example, a trip classified as malicious with a higher confidence score may be assigned with a short TTL, and a trip classified as malicious with a lower confidence score may be assigned with a longer TTL. In some embodiments, the TTLs may be assigned based on the class label of the malicious trip. For example, if a trip is classified as malicious with a label of "fake GPS" (e.g., if a trip is classified with "fake GPS," there is a high certainty that the trip is an actual malicious trip), a shorter TTL may be assigned to the trip; if a trip is classified as malicious with a label of "a rooted device" (e.g., using a rooted device may lead a malicious trip, but it may not be true all the time), a longer TTL may be assigned to the trip. In some embodiments, the majority (e.g., above 99%) of the newly classified trips are benign trips, and thus there may be a large pool of benign trip candidates to select from to add to the training data. For example, a number of the new trips classified as benign with the highest confidence score (or with confidence scores greater than a threshold) may be selected.

In some embodiments, the classifier optimization component 119 may be configured to re-train (e.g., optimize) the classifier based on the expanded training data obtained by the training data expansion component 118. The re-training process may only base on the newly obtained training data (e.g., based on the plurality of features of trips in the set of malicious trip candidates), or based on all of the available training data. In some embodiments, the training data may be further pruned by removing the training samples that are older than a preset period of time.

Figure 2:
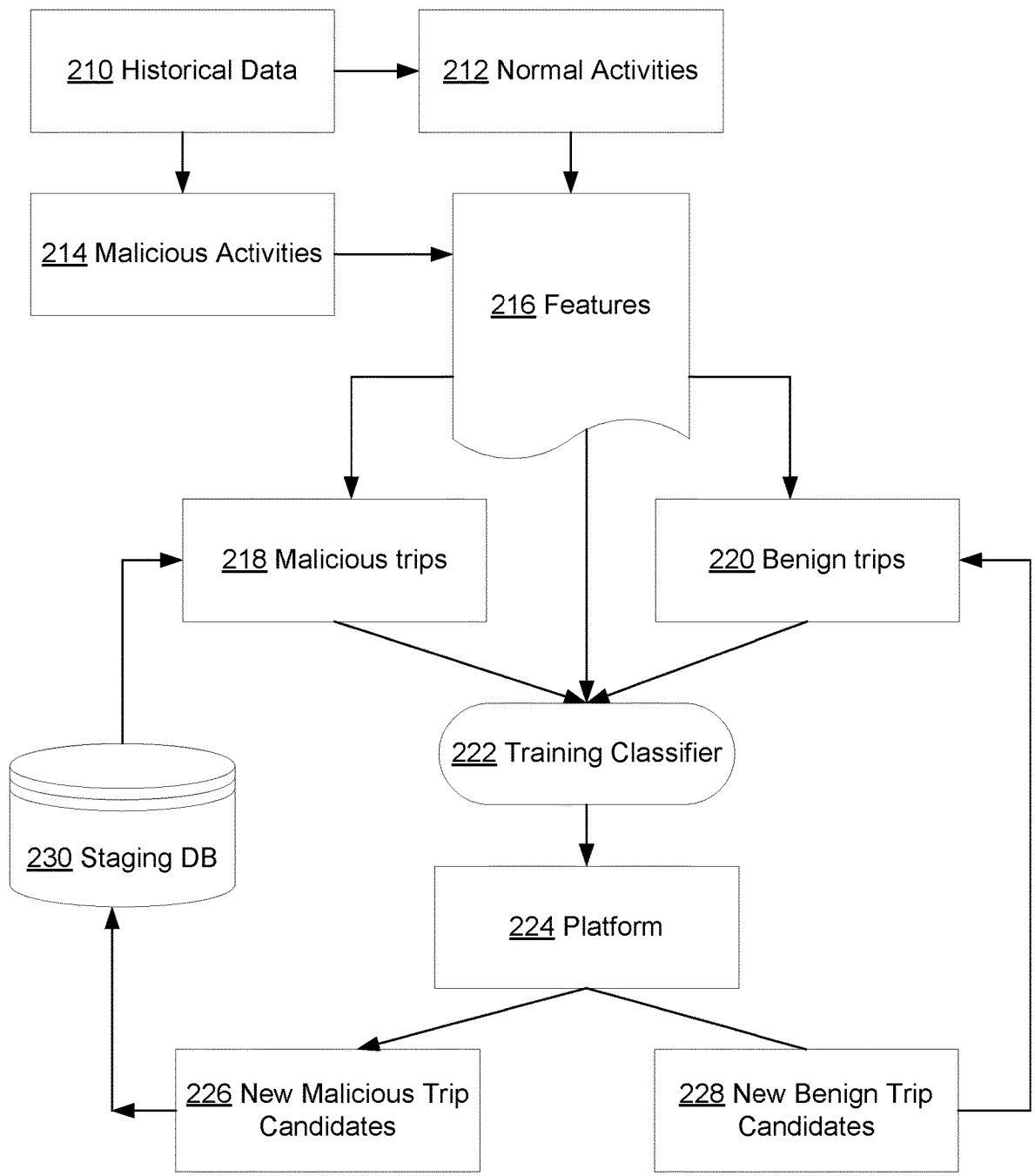
FIG. 2 illustrates an exemplary system diagram for detecting malicious activities in a ride-hailing platform in accordance with various embodiments.

FIG. 2 illustrates an exemplary system diagram for detecting malicious activities in a ride-hailing platform in accordance with various embodiments. The system diagram in FIG. 2 is for illustrative purposes, and depending on different implementations, may include fewer, more, or alternative steps. In some embodiments, some of the steps in the system diagram may occur in an order different from the order shown in FIG. 2.

In some embodiments, historical data 210 may be regularly collected by the ride-hailing platform. These historical data 210 may be manually reviewed or automatically mined to identify a plurality of malicious activities 214 and normal activities 212 (also called benign activities). In some embodiments, malicious activities 214 of trips may be determined by combining user features, trip features, and environmental features (e.g., application features in the mobile devices that are related to the trips). For example, the environmental features include the operating system and applications downloaded or/and installed or/and running (there may be many combinations to form a more complicated feature out of several simple conditions) in a user's phone. Each of the applications may be researched in a hardware and software sandbox (e.g., an inhouse real or virtual device with an isolated operating system and Wi-Fi network) to determine the identification (names, addresses, certificate and signature to sign the executable file and to publish in app stores) and the business purpose and intention of the application, the way the application runs, the log it produces, and parameters it invokes in the sandbox, the API calls it triggers, the network traffic traces it initiates, etc. One of the reasons behind this examination is that a same application icon in different user's phones may activate different executable files (some might be modified by a third party developer, some might be malicious, while some might be totally benign for the ride sharing platform), and the ride-hailing platform may need to distinguish them. For example, when an original executable file is modified, the original developer certificate may be lost and replaced by a new developer certificate. That is, applications with the same package name may be associated with totally different executable files and thus have different hashing. Among the different applications sharing the same package names, different versions and origins are collected from various data sources such as internet and external vendors, and then may be stored in a distributed data warehouse. The identification of the applications (MD5, SHA1 and SHA256 hashing of the executable file) may be used to compare with the sample in each user's device and correctly identify and detect if the user's sample is malicious and which malware group it belongs to. The maliciousness of the applications may be linked to the user of the phone where the application is downloaded, installed and/or running, as well as the trip that the user participates, to certain tagged features in the machine learning algorithm.

In some embodiments, a plurality of latitude/longitude pairs (and altitude information in some cases) across a plurality of points in time during a historical trip may be obtained to determine whether the historical trip comprises "fake GPS signals." The latitude/longitude pairs may provide information such as suspicious routes (e.g., same departure and destination) or "rocket speed." For example, the instantaneous velocity of the historical trip may be determined based on the first order derivative of the latitude information and longitude information, and the instantaneous acceleration of the historical trip may be determined based on the second order derivative of the latitude information and longitude information. The instantaneous velocity and instantaneous acceleration of the historical trip may be fed into a decision tree to determine whether the trip is a malicious trip or not (whether the instantaneous acceleration or the instantaneous velocity is unrealistic, i.e., "rocket speed"). In some embodiments, "off-app trading" may be similarly detected based on the plurality of latitude/longitude pairs of a historical trip. For example, a suspicious "off-app trading" may be identified when an accepted order (e.g., the order has been accepted by the driver) is canceled within a short preset period of time (within 1 or 2 minutes) but the latitude/longitude pairs are consistent with the original route associated with the canceled order. In some embodiments, fake accounts and/or fake device IDs may be detected, and thus the trips associated with these accounts and devices may be determined as malicious. The fake account/device ID may be determined by various methods, such as whether the corresponding operating system (e.g., Android or IOS) is rooted, and/or whether malicious software is installed (e.g., BusyBox, Device ID Changer). In some embodiments, in order to obtain the afore-mentioned information (e.g., rooting/malicious software), the app-list and/or MD5-list of the corresponding device may be obtained and analyzed.

In some embodiments, based on the plurality of malicious activities 214 and normal activities 212, a plurality of features 216 of devices associated with trips may be determined so that a trip may be classified as malicious or normal based on the feature values of the trip. The selection of these features 216 may be accomplished by existing feature selection, variable selection, attribute selection, or variable subset selection algorithms. In some embodiments, these features 216 may include International Mobile Equipment Identity (IMEI) numbers of the devices associated with the trips, MD5-lists of applications installed on the devices, and latitude/longitude information of the trips. For each trip, one or more devices may be involved, e.g., at least one driver and at least one passenger. The IMEI numbers of all the devices associated with a trip may be obtained to identify malicious activities. For example, if the driver device and passenger device have the same IMEI, the trip may be a fake trip. As another example, IMEI numbers of a plurality of devices associated with a pending trip (order) may be obtained at real-time. If it is determined that one of the IMEIs is on a blacklist, the trip may be classified as malicious. In some embodiments, if the historical data shows safety complaints about the IMEI, the platform may send alarm messages to the other devices associated with the trip. In some embodiments, an MD5-list of a device may include a list of hash values of the applications installed on the device. The hash values may allow the ride-hailing platform to identify if any malicious application is installed on the device, such as an application may perform system rooting operations, a non-official ride-hailing application, an official ride-hailing application but with a non-official version number, etc. In some cases, if an application's hash value matches any application sample stored in the ride-hailing platform backend, the system may exam the application sample (e.g., in a sandbox) to determine whether it is a suspicious application. In some embodiments, the latitude/longitude information of a trip may allow the ride-hailing platform to determine the velocity and/or acceleration of the trip, which may reveal whether the trip is a legitimate trip. In some embodiments, the latitude/longitude information of a trip may allow the ride-hailing platform to determine the actual route of a vehicle so that it may detect off-app trading activities.

In some embodiments, the plurality of features 216 may include features of applications installed on the devices, environment features, other suitable features, or any combination thereof. For example, the features of an application (e.g., referring to the executable file of the application) installed on a device may include URLs that the application visits, the device information, proxy information, the permissions to system services on the device that are requested by the application and/or granted to the application. In some embodiments, the ride-hailing platform may prepare and download a pool of applications from various sources (e.g., App Store, Play Store, or websites) and identify the applications installed on users' devices by comparing with the hashes of the applications. This way, the ride-hailing platform may diagnose the applications to detect maliciousness. In other embodiments, the ride-hailing platform may search and download applications based on the metadata (e.g., application identifier, URL linked to the application) of the applications installed on users' devices, and perform the diagnosis based on the downloaded applications. In some embodiments, the features of applications installed on user devices may further include developer certificate (e.g., whether the user of the device is a certified developer to use the device), application list of the device (e.g., benign applications, rooting applications), permissions granted to the applications on the device (e.g., a device may be identified as suspicious if a video streaming application therein is granted the permission to mock locations), open advertiser ID (OAID) of the device (e.g., a soft ID of a device, which may be changed after each reboot). For example, the android application package (APK) of an application installed on a device may be obtained and analyzed to determine one or more URLs, IPs, or domain names that the APK designed to visit. If any of the URLs, IPs, or domain names are associated with known malicious activities, the trip associated with the device that has installed the application may be deemed as malicious.

In some embodiments, based on the plurality of features 216, a plurality of historical trips may be classified as an initial set of malicious trips 218 and an initial set of benign trips 220. These initial sets may be used to train a classifier 222 by learning a plurality of weights (e.g., parameters) for the plurality of features 216. The classifier 222 may be trained using supervised learning and may be implemented by a decision tree, a neural network, or another suitable algorithm. In some embodiments, the classifier 222 may output a classification for a trip, as well as a confidence score of the classification.

In some embodiments, the trained classifier 222 may be deployed in the ride-hailing platform 224 to act as an online decision system. The online decision system may exam pending trips (e.g., an order received from a passenger, and/or an order that has been accepted by a driver), trips being served, and/or trips that have been served. In some embodiments, the values corresponding to the plurality of features 216 may be extracted from the trip information, and the trained classifier 222 may determine whether the trip is malicious or benign. After a first period of time of classification, the newly identified malicious trips are collected as new malicious trip candidates 226, and the newly identified benign trips are collected as new benign trip candidates 228. In practice, the majority of the trips are benign trips, and thus the number of benign trip candidates may be greater than the number of malicious trip candidates. In some embodiments, a set of the new benign trip candidates 228 may be sampled based on the corresponding confidence scores. For example, among the thousands of benign trip candidates 228, the top one hundred of candidates with the highest confidence scores may be selected and fed into the benign trip training samples 220. As another example, the candidates with confidence scores greater than a preset threshold (e.g., 95%) may be selected and fed into the benign trip training samples 220. The expanded benign trips 220 may be used to re-train and update the classifier 222.

On the other hand, the number of malicious trip candidates 226 may be smaller in comparison to the number of benign trip candidates 228, and thus sampling from such a smaller pool of candidates may not be efficient. In some embodiments, the malicious trip candidates 226 may be stored in a staging database 230 for a second period of time for data cleansing. The length of staging may vary depending on the implementation. During the staging period (e.g., the second period of time), supplementary data may be obtained regarding the malicious trip candidates stored in the staging database 230. In some embodiments, the supplementary data may bail out a malicious trip from the staging database 230. For example, when a trip is marked as malicious by the ride-hailing platform 224, the driver or passenger who is negatively affected may naturally file a complaint to the customer service department of the platform. The complaint may be verified to remove the corresponding trip from the staging database. This way, the malicious trip candidates may be kept in the staging database 230 for a period of time and may be removed from the staging database 230 conveniently during regular customer service operations. After the period of time has elapsed, the remaining malicious trip candidates automatically become affirmed malicious trips and may be fed into the malicious trips 210 as new training samples to re-train the classifier 222.

Figure 3:
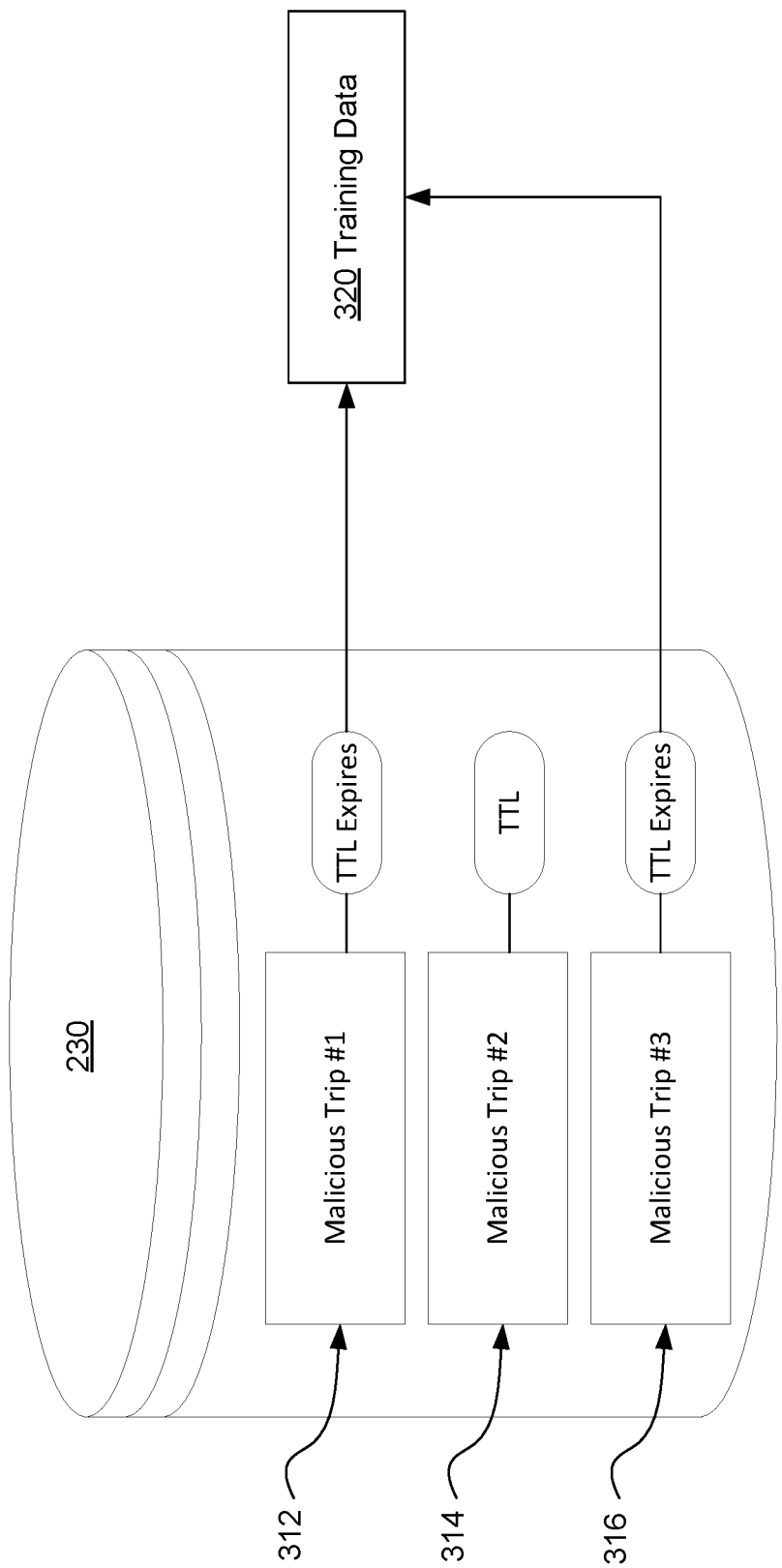
FIG. 3 illustrates an exemplary diagram of data cleansing for detecting malicious activities in a ride-hailing platform in accordance with various embodiments.

FIG. 3 illustrates an exemplary diagram for data cleansing for detecting malicious activities in a ride-hailing platform in accordance with various embodiments. In some embodiments, a trained classifier may be deployed in a ride-hailing platform to perform trip classification and collection to obtain the new malicious trip candidates on a daily basis or another suitable interval. The new malicious trip candidates from one day may be stored in the staging database 230 for a preset period for the "data cleansing period" (such as two weeks). During this "data cleansing period," supplementary data may be obtained to vindicate some of the malicious trip candidates in the staging database. For example, the supplementary data may include user complaints and related proofs. The malicious trip candidates that remain in the staging database 230 after the "data cleansing period" may be automatically transferred out (or fetched from) the staging database 230 and become new training data. In some embodiments, the malicious trip candidates 226 that have been stored in the staging database 230 for two weeks may be fetched out of the staging database 230 as new training samples 320.

In some embodiments, the new malicious trip candidates 226 may be assigned different TTL values. A TTL may include how long the corresponding candidate needs to stay in the staging database 230 before it becomes a training sample. As mentioned above, during the classification process, the trained classifier may classify a trip to one of a plurality of malicious classes (e.g., malicious IMEI, fake account, rocket speed). Different malicious classes may correspond to different TTLs. For example, a trip from a known malicious device (malicious IMEI) may have a high likelihood to be an actual malicious trip, and thus may be assigned with a shorter TTL. In some embodiments, the trained classifier may output confidence scores for the classifications. For example, a malicious trip candidate with a high classification confidence score may indicate the classifier determines that the trip has a higher chance to be an actual malicious trip. Accordingly, the TTLs of the malicious trip candidates may be assigned based on the confidence scores. A higher confidence score may correspond to a shorter TTL, and a lower confidence score may correspond to a longer TTL.

Referring to FIG. 3, three malicious trip candidates 312, 314, and 316 are stored in the staging database 230 and are assigned different TTLs. In some embodiments, some malicious trip candidates with expired TTLs may be fetched from the staging database 230 periodically or pushed out of the staging database 230 when the corresponding TTLs are expired. In FIG. 3, the malicious trip candidates 312 and 316 have stayed in the staging database 230 long enough and the corresponding TTLs are expired. Thus these two malicious trip candidates may be fetched from or pushed out of the staging database 230 and become part of the training data 320. In comparison, the TTL of the malicious trip candidate 314 is not expired yet and needs to stay in the staging database 230.

Figure 4:
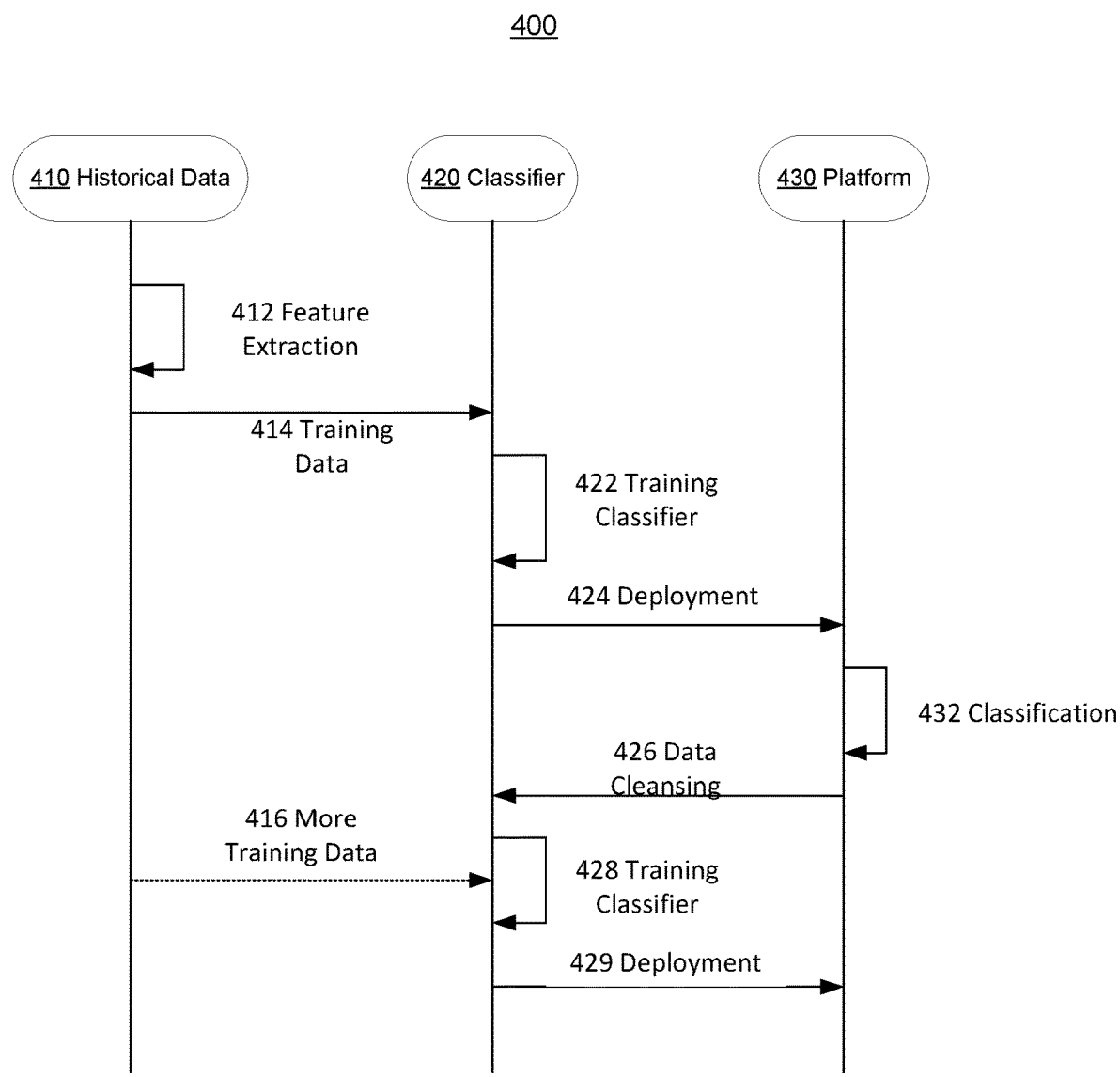
FIG. 4 illustrates an exemplary flow chart of a method for detecting malicious activities in a ride-hailing platform in accordance with various embodiments.

FIG. 4 illustrates an exemplary flow chart of a method 400 for detecting malicious activities in a ride-hailing platform in accordance with various embodiments. The method 400 is merely illustrative. Depending on the implementation, the method 400 may have more, fewer, or alternative steps or components. The method 400 may be implemented by the computing system 102 in FIG. 1.

As shown, the method 400 may include a ride-hailing platform 430, historical data 410 collected by the ride-hailing platform 430, and a classifier 420 trained based on the historical data 410 and training samples newly generated by the ride-hailing platform 430.

At step 412, a plurality of malicious activities may be manually identified from the historical data 410. Based on the identified malicious activities, a plurality of distinguishing features may be extracted. These features may effectively distinguish malicious activity from a normal activity based on the historical data 410.

At step 414, the historical data 410 may be examined based on the extracted features to obtain a plurality of malicious trips and a plurality of normal trips as training data. The training data may be used to train a classifier 420 at step 422. The training process may be implemented by various machine learning algorithms, and the classifier 420 may be implemented as a decision tree, a neural network, or another suitable architecture.

At step 424, the trained classifier 420 may be deployed to the ride-hailing platform 430 to perform classification. In some embodiments, the trained classifier 420 may be deployed as an on-line decision system to classify incoming trips in real-time. In some embodiments, the trained classifier 420 may be deployed as a backend classifier to classify the trips that have been served. In some embodiments, the classifier 420 may be deployed to perform classification both in real-time and in the backend.

During classification at step 432, the ride-hailing platform 430 may obtain a plurality of newly identified malicious trip candidates. These candidates may go through a data cleansing step 326 to affirm the candidates as new training data. In some embodiments, the ride-hailing platform 430 may also obtain a plurality of newly identified normal trip candidates during the classification step 432. Some normal trip candidates with high confidence scores may be sampled as new training data. In some embodiments, besides the new training data obtained from the ride-hailing platform 430 (through data cleansing 426 and/or data sampling), some of the historical trips may further be manually examined and added to the training data at step 416.

At step 428, the classifier 420 may be further trained based on the newly obtained training data. The new training data may allow the classifier 420 to effectively identify new malicious patterns. Subsequently, at step 429, the updated/optimized classifier 420 may be deployed in the ride-hailing platform for service. This deployment-classification-training data expansion-retraining-deployment cycle may automatically executed.

Figure 5:
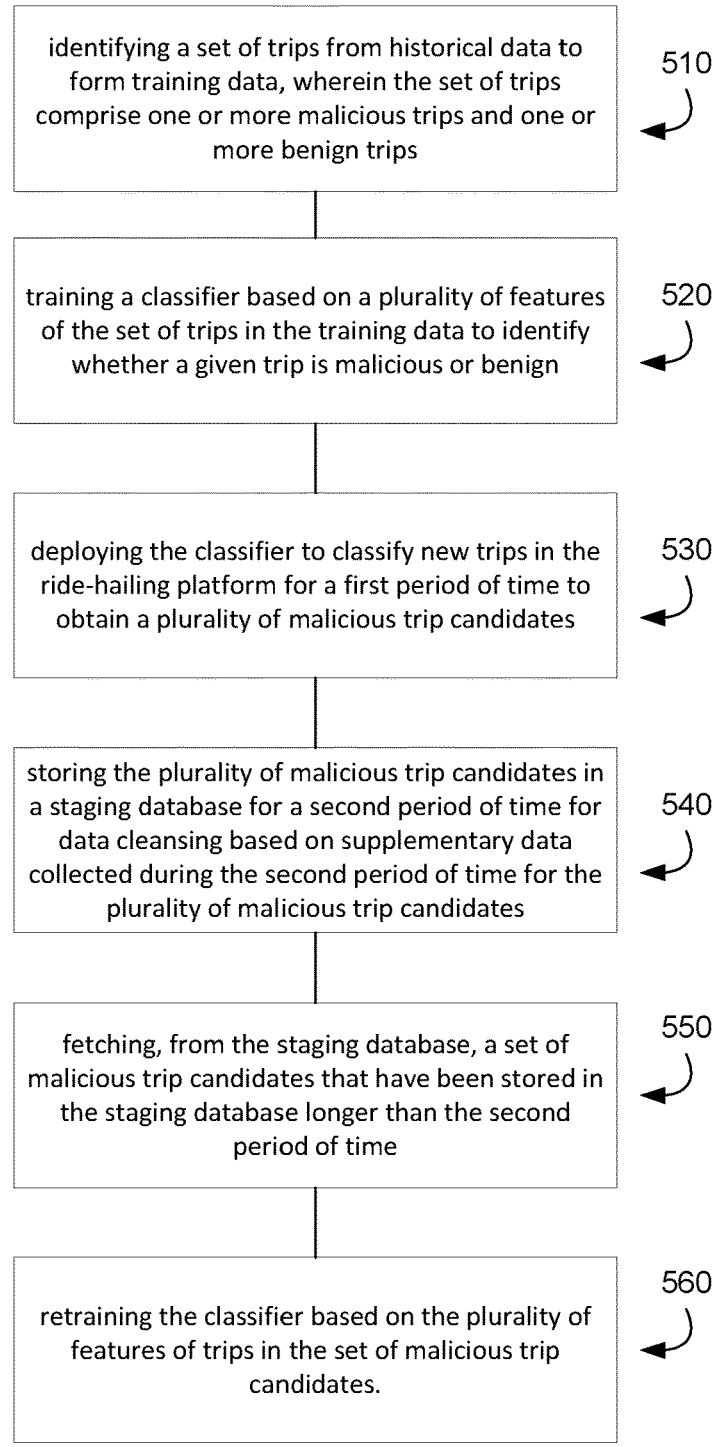
FIG. 5 illustrates an exemplary method for detecting malicious activities in a ride-hailing platform in accordance with various embodiments.

FIG. 5 illustrates an exemplary method 500 for detecting malicious activities in a ride-hailing platform in accordance with various embodiments. The method 500 may be implemented in an environment shown in FIG. 1. The method 500 may be performed by a device, apparatus, or system illustrated by FIGS. 1-4, such as the system 102. Depending on the implementation, the method 500 may include additional, fewer, or alternative steps performed in various orders or in parallel.

Block 510 includes identifying a set of trips from historical data to form training data, wherein the set of trips comprise one or more malicious trips and one or more benign trips. In some embodiments, the identifying a set of trips from historical data comprises: for a historical trip, obtaining latitude information and longitude information across a plurality of points in time; obtaining an instantaneous velocity of the historical trip based on a first order derivative of the latitude information and longitude information; obtaining an instantaneous acceleration of the historical trip based on a second order derivative of the latitude information and longitude information; and determining the historical trip as a malicious trip when the instantaneous velocity or the instantaneous acceleration is greater than a corresponding threshold.

Block 520 includes training a classifier based on a plurality of features of the set of trips in the training data to identify whether a given trip is malicious or benign, wherein the plurality of features comprise identification numbers of devices associated with the set of trips, and latitude/longitude information of the set of trips in the training data. In some embodiments, the plurality of features further comprise: a list of applications installed on each of the devices, and access permissions to system services granted to the list of applications.

Block 530 includes deploying the classifier to classify new trips in the ride-hailing platform for a first period of time to obtain a plurality of malicious trip candidates. In some embodiments, the identifier numbers of the devices comprise International Mobile Equipment Identity (IMEI) numbers, and the deploying the classifier to classify new trips comprises: extracting IMEI numbers of a plurality of devices associated of a new trip at real-time; determining whether one of the plurality of devices has a IMEI number that matches an item in a blacklist; and sending a warning message to each of the plurality of devices other than the one device. In some embodiments, the lists of applications comprises MD5-lists of the applications that indicate versions of the applications installed on the devices.

Block 540 includes storing the plurality of malicious trip candidates in a staging database for a second period of time for data cleansing based on supplementary data collected during the second period of time for the plurality of malicious trip candidates, wherein a malicious trip candidate is removed from the staging database when the corresponding supplementary data indicate that the malicious trip candidate is false-positively classified. In some embodiments, the classifier classifies the new trips as malicious or benign with corresponding confidence scores, the storing the plurality of malicious trip candidates into a staging database for a second period of time for data cleansing comprises assigning a Time-To-Live (TTL) to each of the plurality of malicious trip candidates based on the confidence score of the each malicious trip candidate. In some embodiments, the supplementary data is extracted from a complaint proving the malicious trip candidate is false-positively identified. In some embodiments, the first period time is a day, and the second period of time is two weeks.

Block 550 includes fetching, from the staging database, a set of malicious trip candidates that have been stored in the staging database longer than the second period of time. In some embodiments, the fetching a set of malicious trip candidates that have been stored in the staging database longer than the second period of time from the staging database comprises fetching a malicious trip that has been stored in the staging database longer than the assigned TTL.

Block 560 includes re-training the classifier based on the plurality of features of trips in the set of malicious trip candidates.

In some embodiments, the method 500 may further comprise deploying the classifier to classify new trips to obtain a plurality of benign trip candidates with corresponding confidence scores; and sampling, from the plurality of benign trip candidates, a set of benign trip candidates with highest classification confidence scores; and updating the training data by adding the set of benign trip candidates.

In some embodiments, the method 500 may further comprise obtaining an android application package (APK) of one of the applications installed on the devices; determining one or more Uniform Resource Locators (URLs), Internet Protocol (IP) addresses, or domain names that the APK designed to visit; and determining whether a trip associated with the device is malicious based on the one or more URLs, IP addresses, or domain names.

Figure 6:
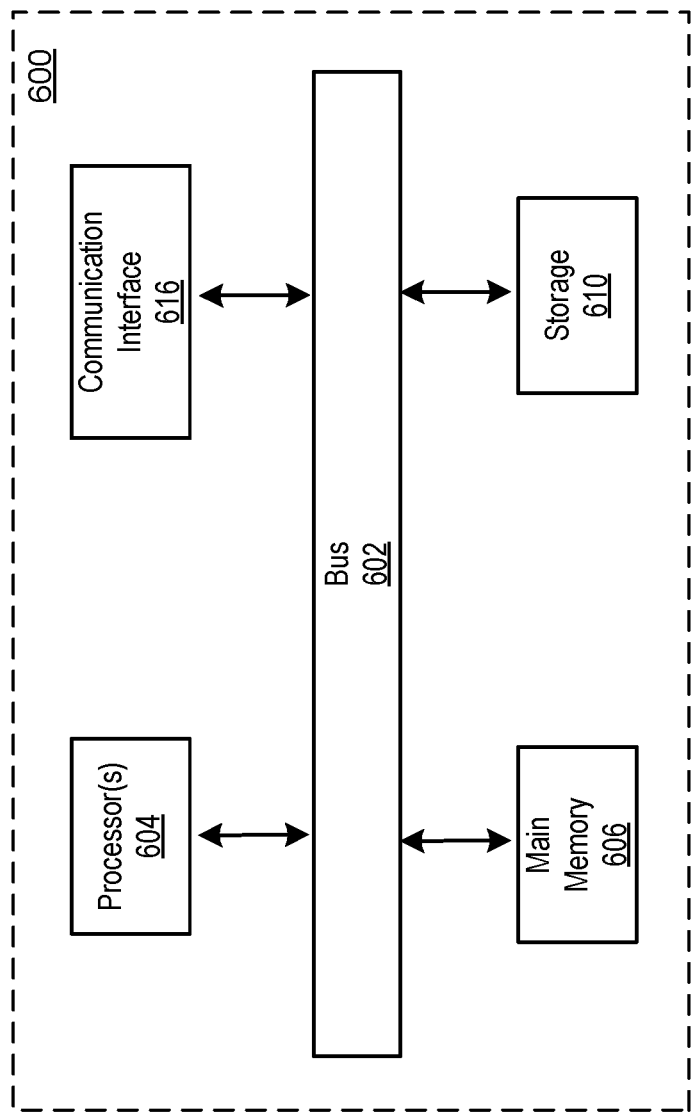
FIG. 6 illustrates a block diagram of a computer system in which any of the embodiments described herein may be implemented.

FIG. 6 illustrates an example computing device in which any of the embodiments described herein may be implemented. The computing device may be used to implement one or more components of the systems and the methods shown in FIGS. 1-7. The computing device 600 may comprise a bus 602 or other communication mechanism for communicating information and one or more hardware processors 604 coupled with bus 602 for processing information. Hardware processor(s) 604 may be, for example, one or more general purpose microprocessors.

The computing device 600 may also include a main memory 606, such as a random-access memory (RAM), cache and/or other dynamic storage devices 610, coupled to bus 602 for storing information and instructions to be executed by processor(s) 604. Main memory 606 also may be used for storing temporary variables or other intermediate information during execution of instructions to be executed by processor(s) 604. Such instructions, when stored in storage media accessible to processor(s) 604, may render computing device 600 into a special-purpose machine that is customized to perform the operations specified in the instructions. Main memory 606 may include non-volatile media and/or volatile media. Non-volatile media may include, for example, optical or magnetic disks. Volatile media may include dynamic memory. Common forms of media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a DRAM, a PROM, an EPROM, a FLASH-EPROM, NVRAM, any other memory chip or cartridge, or networked versions of the same.

The computing device 600 may implement the techniques described herein using customized hard-wired logic, one or more ASICs or FPGAs, firmware and/or program logic which in combination with the computing device may cause or program computing device 600 to be a special-purpose machine. According to one embodiment, the techniques herein are performed by computing device 600 in response to processor(s) 604 executing one or more sequences of one or more instructions contained in main memory 606. Such instructions may be read into main memory 606 from another storage medium, such as storage device 610. Execution of the sequences of instructions contained in main memory 606 may cause processor(s) 604 to perform the process steps described herein. For example, the processes/methods disclosed herein may be implemented by computer program instructions stored in main memory 606. When these instructions are executed by processor(s) 604, they may perform the steps as shown in corresponding figures and described above. In alternative embodiments, hardwired circuitry may be used in place of or in combination with software instructions.

The computing device 600 also includes a communication interface 616 coupled to bus 602. Communication interface 616 may provide a two-way data communication coupling to one or more network links that are connected to one or more networks. As another example, communication interface 616 may be a local area network (LAN) card to provide a data communication connection to a compatible LAN (or WAN component to communicate with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A computer-implemented method for detecting malicious activities in a ride-hailing platform, the method comprising:
    identifying a set of trips from historical data to form training data, wherein the set of trips comprise one or more malicious trips and one or more benign trips;
    training a classifier based on a plurality of features of the set of trips in the training data to identify whether a given trip is malicious or benign, wherein the plurality of features comprise identification numbers of devices associated with the set of trips, and latitude/longitude information of the set of trips in the training data;
    deploying the classifier to classify new trips in the ride-hailing platform for a first period of time to obtain a plurality of malicious trip candidates;
    storing the plurality of malicious trip candidates in a staging database for a second period of time for data cleansing based on supplementary data collected during the second period of time for the plurality of malicious trip candidates, wherein a malicious trip candidate is removed from the staging database when the supplementary data indicate that the malicious trip candidate is false-positively classified;
    fetching, from the staging database, a set of malicious trip candidates that have been stored in the staging database longer than the second period of time; and
    re-training the classifier based on the plurality of features of trips in the set of malicious trip candidates.

2. The method of claim 1, wherein the classifier classifies the new trips as malicious or benign with corresponding confidence scores,
    the storing the plurality of malicious trip candidates into a staging database for a second period of time for data cleansing comprises assigning a Time-To-Live (TTL) to each of the plurality of malicious trip candidates based on the confidence score of the each malicious trip candidate, and
    the fetching a set of malicious trip candidates that have been stored in the staging database longer than the second period of time from the staging database comprises fetching a malicious trip that has been stored in the staging database longer than the assigned TTL.

3. The method of claim 1, further comprising:
    deploying the classifier to classify new trips to obtain a plurality of benign trip candidates with corresponding confidence scores; and
    sampling, from the plurality of benign trip candidates, a set of benign trip candidates with highest classification confidence scores; and
    updating the training data by adding the set of benign trip candidates.

4. The method of claim 1, wherein the supplementary data is extracted from a complaint proving the malicious trip candidate is false-positively identified.

5. The method of claim 1, wherein the identifying a set of trips from historical data comprises:
- for a historical trip, obtaining latitude information and longitude information across a plurality of points in time;
- obtaining an instantaneous velocity of the historical trip based on a first order derivative of the latitude information and longitude information;
- obtaining an instantaneous acceleration of the historical trip based on a second order derivative of the latitude information and longitude information; and
- determining the historical trip as a malicious trip when the instantaneous velocity or the instantaneous acceleration is greater than a corresponding threshold.

6. The method of claim 1, wherein the plurality of features further comprise:
- a list of applications installed on each of the devices, and access permissions to system services granted to the list of applications.

7. The method of claim 1, wherein the first period time is a day, and the second period of time is two weeks.

8. The method of claim 1, wherein the identifier numbers of the devices comprise International Mobile Equipment Identity (IMEI) numbers, and the deploying the classifier to classify new trips comprises:
- extracting IMEI numbers of a plurality of devices associated of a new trip at real-time;
- determining whether one of the plurality of devices has an IMEI number that matches an item in a blacklist; and
- sending a warning message to each of the plurality of devices other than the one device.

9. The method of claim 1, wherein the plurality of features further comprise MD5-lists of versions of one or more applications installed on the devices.

10. The method of claim 1, further comprising:
- obtaining an android application package (APK) of one of the applications installed on the devices;
- determining one or more Uniform Resource Locators (URLs), Internet Protocol (IP) addresses, or domain names that the APK designed to visit; and
- determining whether a trip associated with the device is malicious based on the one or more URLs, IP addresses, or domain names.

11. A system comprising one or more processors and one or more non-transitory computer-readable memories coupled to the one or more processors, the one or more non-transitory computer-readable memories storing instructions that, when executed by the one or more processors, cause the system to perform operations comprising:
- identifying a set of trips from historical data to form training data, wherein the set of trips comprise one or more malicious trips and one or more benign trips;
- training a classifier based on a plurality of features of the set of trips in the training data to identify whether a given trip is malicious or benign, wherein the plurality of features comprise identification numbers of devices associated with the set of trips, and latitude/longitude information of the set of trips in the training data;
- deploying the classifier to classify new trips in a ride-hailing platform for a first period of time to obtain a plurality of malicious trip candidates;
- storing the plurality of malicious trip candidates in a staging database for a second period of time for data cleansing based on supplementary data collected during the second period of time for the plurality of malicious trip candidates, wherein a malicious trip candidate is removed from the staging database when the supplementary data indicate that the malicious trip candidate is false-positively classified;
- fetching, from the staging database, a set of malicious trip candidates that have been stored in the staging database longer than the second period of time; and
- re-training the classifier based on the plurality of features of trips in the set of malicious trip candidates.

12. The system of claim 11, wherein the classifier classifies the new trips as malicious or benign with corresponding confidence scores,
- the storing the plurality of malicious trip candidates into a staging database for a second period of time for data cleansing comprises assigning a Time-To-Live (TTL) to each of the plurality of malicious trip candidates based on the confidence score of the each malicious trip candidate, and
- the fetching a set of malicious trip candidates that have been stored in the staging database longer than the second period of time from the staging database comprises fetching a malicious trip that has been stored in the staging database longer than the assigned TTL.

13. The system of claim 11, wherein the operations further comprise:
- deploying the classifier to classify new trips to obtain a plurality of benign trip candidates with corresponding confidence scores; and
- sampling, from the plurality of benign trip candidates, a set of benign trip candidates with highest classification confidence scores; and
- updating the training data by adding the set of benign trip candidates.

14. The system of claim 11, wherein the identifying a set of trips from historical data comprises:
- for a historical trip, obtaining latitude information and longitude information across a plurality of points in time;
- obtaining an instantaneous velocity of the historical trip based on a first order derivative of the latitude information and longitude information;
- obtaining an instantaneous acceleration of the historical trip based on a second order derivative of the latitude information and longitude information; and
- determining the historical trip as a malicious trip when the instantaneous velocity or the instantaneous acceleration is greater than a corresponding threshold.

15. The system of claim 11, wherein the plurality of features further comprise:
- a list of applications installed on each of the devices, and access permissions to system services granted to the list of applications.

16. The system of claim 11, wherein the plurality of features further comprise MD5-lists of versions of one or more applications installed on the devices.

17. A non-transitory computer-readable storage medium storing instructions that, when executed by one or more processors, cause the one or more processors to perform operations comprising:
- identifying a set of trips from historical data to form training data, wherein the set of trips comprise one or more malicious trips and one or more benign trips;
- training a classifier based on a plurality of features of the set of trips in the training data to identify whether a given trip is malicious or benign, wherein the plurality of features comprise identification numbers of devices associated with the set of trips, and latitude/longitude information of the set of trips in the training data;

deploying the classifier to classify new trips in a ride-hailing platform for a first period of time to obtain a plurality of malicious trip candidates;

storing the plurality of malicious trip candidates in a staging database for a second period of time for data cleansing based on supplementary data collected during the second period of time for the plurality of malicious trip candidates, wherein a malicious trip candidate is removed from the staging database when the supplementary data indicate that the malicious trip candidate is false-positively classified;

fetching, from the staging database, a set of malicious trip candidates that have been stored in the staging database longer than the second period of time; and re-training the classifier based on the plurality of features of trips in the set of malicious trip candidates.

18. The storage medium of claim 17, wherein the classifier classifies the new trips as malicious or benign with corresponding confidence scores, the storing the plurality of malicious trip candidates into a staging database for a second period of time for data cleansing comprises assigning a Time-To-Live (TTL) to each of the plurality of malicious trip candidates based on the confidence score of the each malicious trip candidate, and the fetching a set of malicious trip candidates that have been stored in the staging database longer than the second period of time from the staging database comprises fetching a malicious trip that has been stored in the staging database longer than the assigned TTL.

19. The storage medium of claim 17, wherein the operations further comprise:

deploying the classifier to classify new trips to obtain a plurality of benign trip candidates with corresponding confidence scores; and sampling, from the plurality of benign trip candidates, a set of benign trip candidates with highest classification confidence scores; and updating the training data by adding the set of benign trip candidates.

20. The storage medium of claim 17, wherein the plurality of features further comprise: a list of applications installed on each of the devices, and access permissions to system services granted to the list of applications.

* * * * *